(12) United States Patent
Powell (10) Patent No.: US 11,495,946 B2
(45) Date of Patent: *Nov. 8, 2022

(54) RODENT RESISTANT GROUND LEVEL ICE BRIDGE

(71) Applicant: BCE Inc., Verdun (CA)

(72) Inventor: Mike Powell, Huntsville (CA)

(73) Assignee: BCE Inc., Verdun (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,500

(22) Filed: Oct. 27, 2020

(65) Prior Publication Data
US 2021/0044095 A1 Feb. 11, 2021

Related U.S. Application Data

(63) Continuation of application No. 15/850,462, filed on Dec. 21, 2017, now Pat. No. 10,819,095.

(60) Provisional application No. 62/440,046, filed on Dec. 29, 2016.

(51) Int. Cl.
| | |
|---|---|
| *H02G 3/04* | (2006.01) |
| *F16L 3/00* | (2006.01) |
| *F16L 3/22* | (2006.01) |
| *H02G 3/02* | (2006.01) |
| *F16L 3/26* | (2006.01) |

(52) U.S. Cl.
CPC .............. *H02G 3/0456* (2013.01); *F16L 3/22* (2013.01); *F16L 3/26* (2013.01); *H02G 3/02* (2013.01); *H02G 3/04* (2013.01)

(58) Field of Classification Search
CPC ...... F16L 3/00; F16L 3/22; F16L 3/26; H02G 3/02; H02G 3/04; H02G 9/00; H02G 3/0456; H04W 88/08
See application file for complete search history.

(56) References Cited

U.S. PATENT DOCUMENTS

| | | | | |
|---|---|---|---|---|
| 2,899,159 | A * | 8/1959 | Leblang | H02G 3/0608 |
| | | | | 248/49 |
| 3,035,800 | A * | 5/1962 | McLeod | H02G 3/0608 |
| | | | | 248/68.1 |
| 4,233,845 | A * | 11/1980 | Pratt, Jr. | A01K 29/005 |
| | | | | 73/865.4 |
| 5,561,950 | A * | 10/1996 | Collins | E02D 27/32 |
| | | | | 248/354.3 |
| 6,431,501 | B1 * | 8/2002 | Molek | H02G 3/0456 |
| | | | | 248/49 |
| 7,980,034 | B2 * | 7/2011 | Fehr | E04C 3/30 |
| | | | | 52/297 |
| 10,819,095 | B2 * | 10/2020 | Powell | H02G 3/0456 |
| 2009/0084056 | A1 * | 4/2009 | Robertson | F16B 9/058 |
| | | | | 52/396.05 |

FOREIGN PATENT DOCUMENTS

KR 20-0421646 * 7/2006

* cited by examiner

*Primary Examiner* — Tan Le (57) ABSTRACT

An ice bridge system for a cellular transmissions site assembled with a ladder frame section to support cabling laid on top of the and a ladder support with a preformed base for resting on a ground surface, a preformed set of mounting points for securing one or more sections of the ladder frame, such that the ladder frames mate end to end with each other and a structural support section between the base and mounting points to support the weight of the ladder frame and supported cables.

19 Claims, 7 Drawing Sheets

RODENT RESISTANT GROUND LEVEL ICE BRIDGE

RELATED APPLICATIONS

This application is a Continuation of U.S. patent application Ser. No. 15/850,462, filed Dec. 21, 2017, which claims priority to U.S. Provisional Patent Application No. 62/440,046, filed Dec. 29, 2016, the entire contents of which are incorporated herein by reference.

TECHNICAL FIELD

The current disclosure relates to infrastructure located at cellular transmission sites and in particular to ice bridges used to protect cabling running between a structure and a transmission tower.

BACKGROUND

Cellular transmission sites have transceiver towers that elevate transceiver antennas. Cabling runs up the tower to the transceivers from equipment shelters that protect communications equipment inside. The cables passing between the equipment shelters and the tower need to be protected from damage. For example, cables may be damaged by falling objects including branches as well as buildup of ice and/or snow on the cables in colder climates.

Ice bridges have been used to protect cables running between transceiver towers and equipment shelters. Ice bridges have been built as elevated structures supported above the ground by poles or pipes securely embedded in the ground. While such structures elevate the cables well above the ground and may help to prevent or reduce damage from animals due to the elevated structure, such ice bridges may require significant infrastructure to be built at the transceiver site.

Alternative ice bridges have provided protection from falling objects and ice/snow buildup without requiring installing the infrastructure required for the elevated ice bridges. Such ice bridges may simply be, for example, an enclosed conduit or ducting on the ground through which the cables may pass. However, such ice bridges may result in animals nesting within the conduit or ducting, which may result in cable damage.

It would be desirable to have additional, alternative and/or improved ice bridge system that protects cables running between a transceiver tower and an equipment shelter.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

In accordance with the present disclosure there is provided an ice bridge for a cellular transmissions site comprising: a ladder frame section to support cables between an equipment shelter and a transceiver tower and a ladder support securing the ladder frame section above a ground surface, the ladder support comprising: a preformed base for resting on the ground surface; and a structural support fixed to the preformed base and extending away from the preformed base, a portion of the structural support adapted to support the ladder frame above the ground surface.

In accordance with a further embodiment of the ice bridge, the ladder support is formed from metal and comprises a plurality of connecting points for attaching grounding wires.

In accordance with a further embodiment of the ice bridge, the portion of the ladder support adapted to support the ladder frame above the ground surface support comprises one or more mounting points for securing the ladder frame to the structural support.

In accordance with a further embodiment of the ice bridge, the ladder frame comprises a plurality of rungs.

In accordance with a further embodiment of the ice bridge, the ladder frame comprises a pair of side rails connected to each other by the plurality of rungs.

In accordance with a further embodiment of the ice bridge, a top surface of the rungs is below a top surface of the pair of side rails.

In accordance with a further embodiment of the ice bridge, a bottom of the ladder frame is uncovered.

In accordance with a further embodiment of the ice bridge, wherein the top of the frame is covered by a cover.

In accordance with a further embodiment of the ice bridge, the cover is removably connected to the ladder frame.

In accordance with a further embodiment of the ice bridge, the cover supports at least 100 lbs resting on the cover when covering the ladder frame.

In accordance with a further embodiment of the ice bridge, the cover has a non-slip surface applied to at least a portion of the top.

In accordance with a further embodiment of the ice bridge, the ladder frame is curved horizontally through about 45 degrees.

In accordance with a further embodiment of the ice bridge, the ladder frame is curved horizontally through about 90 degrees.

In accordance with a further embodiment of the ice bridge, the ladder frame is curved vertically through about 90 degrees.

In accordance with a further embodiment of the ice bridge, the ladder support supports the ladder frame no more than approximately two feet above the ground surface.

In accordance with a further embodiment of the ice bridge, the preformed base is made of fibre reinforced concrete.

In accordance with a further embodiment of the ice bridge, two or more through holes pass vertically through the preformed base.

In accordance with a further embodiment, the ice bridge further comprises a plurality of ladder supports.

In accordance with a further embodiment, the ice bridge further comprises a plurality of ladder frame sections.

In accordance with a further embodiment, the ice bridge further comprises a hinged connector attached between two ladder frame sections.

In accordance with the present disclosure, there is further provided a method of assembling an ice bridge at a cellular transmission site between an equipment shelter and a transceiver tower, the method comprising: installing a ladder support on a ground surface such that a preformed base of the ladder support is in contact with the ground surface and a structural support of the ladder support extends away from the preformed base; and installing a ladder frame section to a structural support of the ladder support such that the ladder frame section is above the ground surface.

In accordance with a further embodiment, the method further comprises grounding the structural support to the earth.

In accordance with a further embodiment of the method, a cover is installed on the top of the ladder frame section.

In accordance with a further embodiment of the method, a non-slip surface is applied to at least a portion of the top of the cover.

In accordance with a further embodiment of the method, the ladder frame section is horizontally curved.

In accordance with a further embodiment of the method, the ladder frame section is vertically curved through 90 degrees.

In accordance with a further embodiment, the method further comprises securing the preformed base with fasteners inserted through holes in the preformed base and into the ground surface.

In accordance with a further embodiment of the method, a plurality of ladder frame sections and ladder supports are installed to form the ice bridge.

In accordance with a further embodiment of the method, a hinged connector is installed between two ladder frame sections, such that the angle between the ladder frame sections is variable.

An ice bridge may be formed from a ladder frame that is supported above the ground by a preformed base. The ladder frame provides the support for the cables while the preformed base supports the ladder frame above the ground. The preformed base rests on the ground allowing the ice bridge to be installed quickly and easily. Further, the ladder frame provides an open support structure for the cables that makes it difficult for animals to form nests within the ice bridge, which may reduce the risk of an animal damaging the cables. The use of ladder frames supported by preformed bases allows an ice bridge to be installed over various terrains. Different ladder frames, which may be bent vertically or horizontally, can be combined together to provide ice bridges in a wide range of configurations.

Figure 1:
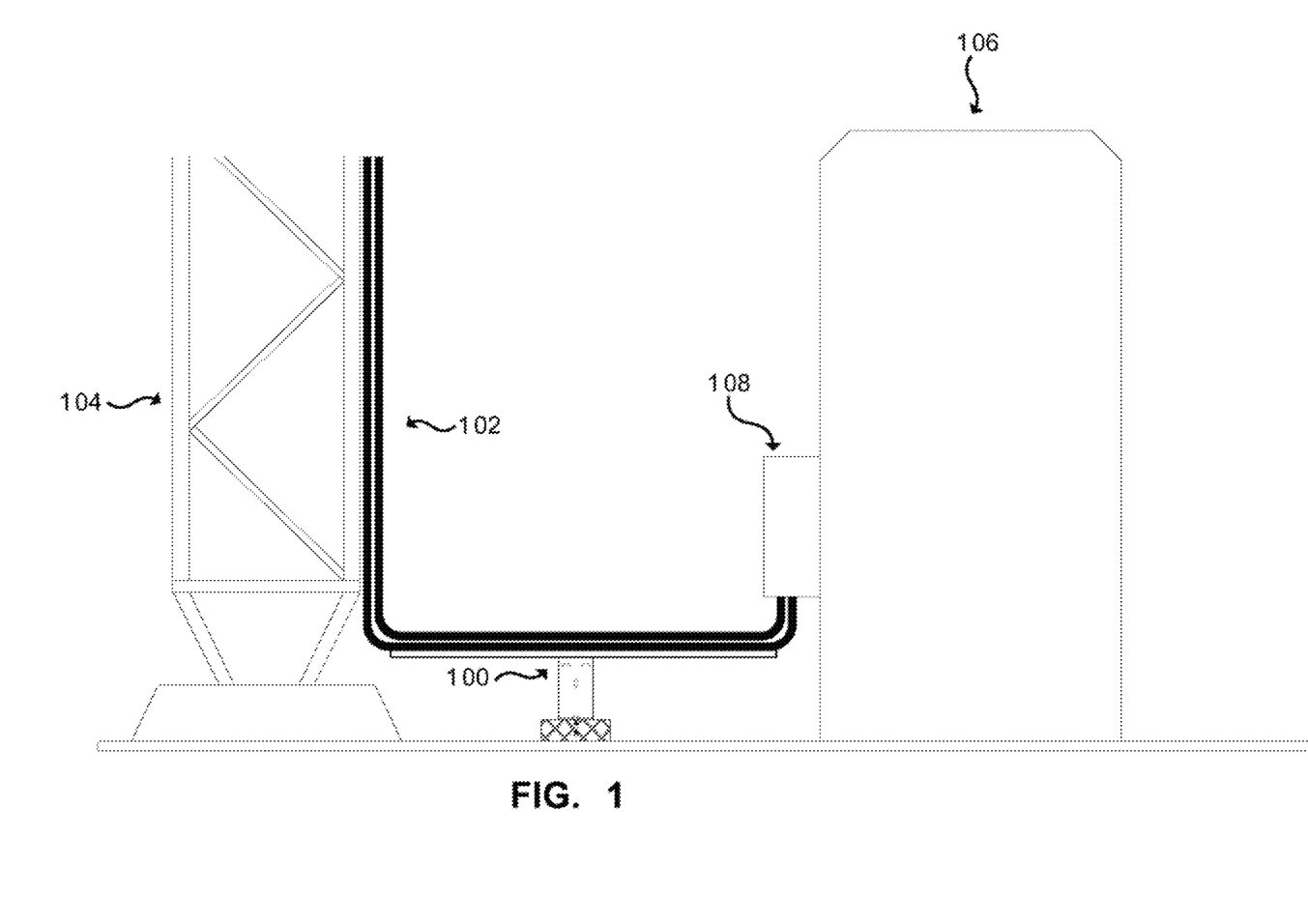
FIG. 1 depicts a side view of an ice bridge connecting a cellphone tower to an equipment shelter.

FIG. 1 depicts a side view of an ice bridge installation. The installation comprises an ice bridge 100 supporting and protecting power and communication cables 102 between a transceiver tower 104 and an equipment shelter 106. The transceiver tower 104 allows transceiver antennas to be mounted in a desirable position. The cables 102 carry signals, which may be electrical and or optical signals, from the antennas or electronics at the antennas to electronics housed within the equipment shelter 106. The cables 102 may enter the equipment shelter 106 through a cable box 108 connected to the outside of the shelter 106, or through an opening in the shelter 106.

The ice bridge 100 may have an open bottom, that is a bottom that is uncovered or exposed such that animals do not have a surface to stand on and build nests. The open bottom reduces a risk of cable damage due to animals as they cannot build nests or rest next to the cables 102. Further, the open bottom may provide improved ventilation to reduce moisture on the cables 102. As depicted, the ice bridge 100 may be provided by a ladder frame on which the cables 102 rest and which in turn is supported on a preformed base frame that rests on the ground. The preformed base frame supports the ladder frame a short distance above the ground such as approximately one or two feet. Supporting the ladder frame close to the ground provides an easy to install ice bridge as well as providing a short ground path to the earth. The ice bridge 100 is installed with a gap between the ice bridge 100 and the equipment shelter 106 in order to provide further protection to the equipment from lightning damage as the electricity has a path to ground without travelling through the equipment shelter 106. Additionally, the low to the ground frame also allows for the ice bridge 100 to be assembled resting on the ground without digging or construction activities, and with minimal hardware.

Figure 2A:
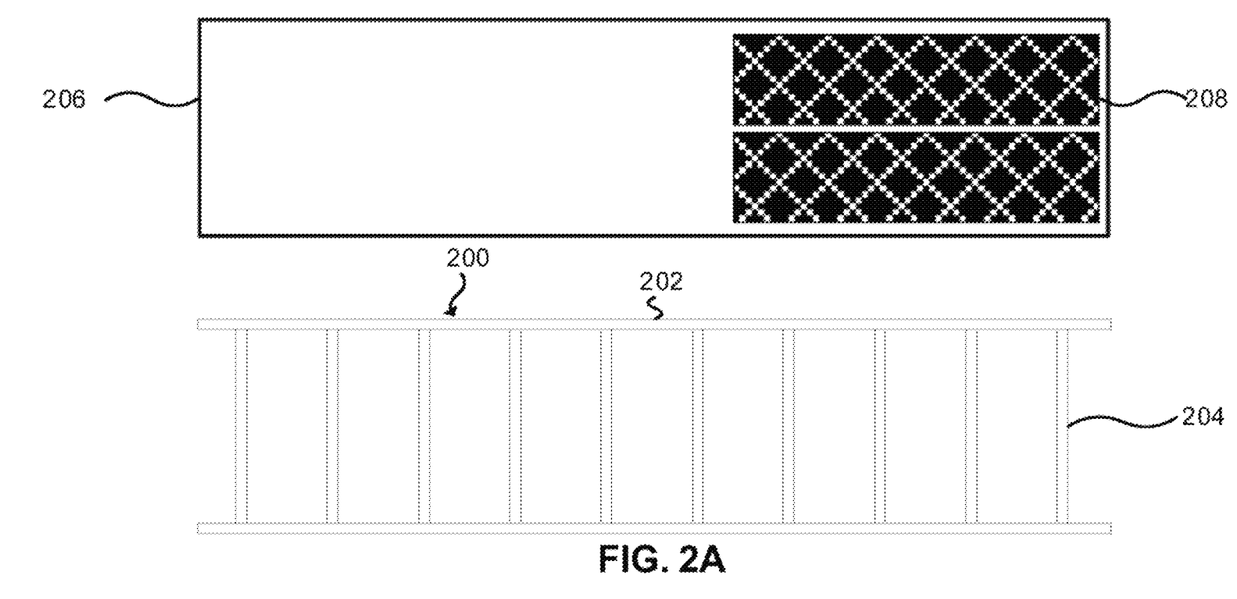
FIG. 2A depicts a top view of a ladder frame and cover.

FIG. 2A depicts the top view of components of an ice bridge. The ice bridge comprises a ladder frame 200 for supporting power and communication cables 102 running between a transceiver tower 104 and equipment shelter 106. The ladder frame 200 comprises pair of side rails 202 connected together by one or more rungs 204. The side rails 202 provide structural stability to the ladder frame 200, and the rungs 204 provide a means for supporting the cables 102 while maintaining the open bottom. The open bottom makes it difficult for animals such as rodents to access or build nests around the cables 102, reducing the risk of damage to the power and communication cables 102 from animal activity.

As depicted in FIG. 2A, a cover 206 may be provided for covering a top of the ladder frame. When in place, the cover 206 provides protection from hazards above the ladder frame 200, such as falling ice, as well as protection from buildup of snow and/or ice on the cables 102. Additionally, the cover 206 may be sufficiently strong, either by being made from a suitably strong material or by having sufficient reinforcement, so as to support an individual standing on the cover 206, as well as to support a particular amount of weight that may be placed on the cover. For example, the cover may be sufficiently strong to support an expected weight of snow and ice as well as that of an individual, animals, etc. For example, the cover may be sufficiently strong to support between about 100 lbs and 500 lbs or more. If the cover 206 is sufficiently strong to support an individual, the cover 206 may also include a non-slip surface 208 to allow for maintenance and support personnel to safely walk across or stand on the cover while performing work.

The cover 206 does not cover the bottom of the ladder frame 200 and as such, the bottom of the ladder frame 200 remains open or otherwise exposed. The rungs 204 of the ladder frame 200 may be flush with the top of the side rails 202 of the ladder frame 200 such that the cables 102 lay above the side rails 202. In such a case, the cover 206 may be secured to the ladder frame to provide a gap between the top surface of the cover 206 and the side rails 202, or more particularly any cables 102 resting on the rungs. Alternatively, the rungs 204 may be recessed below the top of the side rails 202 of the ladder frame 200 such that the cover 206 rests on top of the side rails 202 and does not make contact with the rungs or the cables 102 resting on the rungs 204.

Figure 2B:
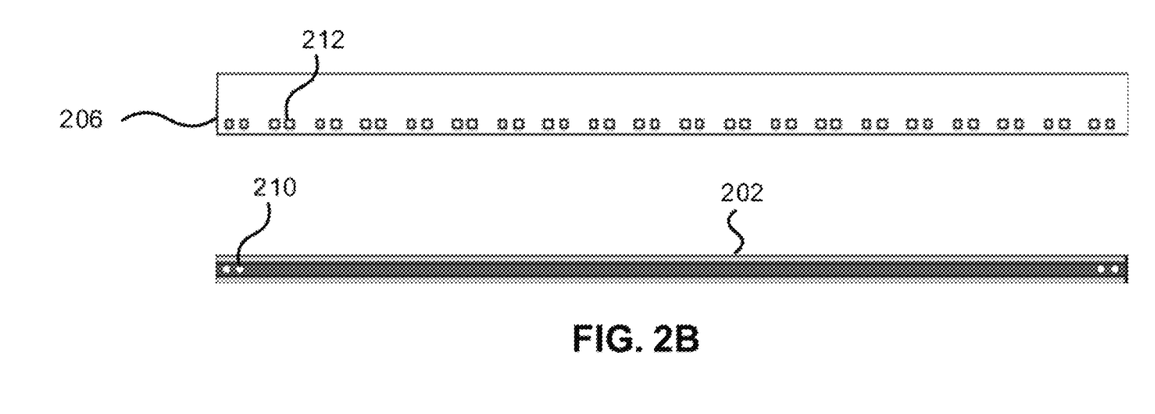
FIG. 2B depicts a side view of the ladder frame and cover.

FIG. 2B depicts the side view of the components of the ice bridge of FIG. 2A. The side rails 202 may have one or more holes 210 drilled through side rails 202 at either end of the ladder frame 200. The holes 210 allow the ladder frame 200 to be mounted to a support structure. It is possible to secure the ladder frame 200 to the base support using other techniques, including interfacing pins or posts, friction fits or other means for supporting and securing the ladder frame 200 to a base. It is possible for the ladder frame 200 to be secured to the base structure using other means including for example clamps.

FIG. 2B also depicts the side view of the cover 206. As depicted, a plurality of holes 212 may be spaced along a bottom of the cover 206 to allow for the cover to be mounted, either directly to the side rails 202 or to base supporting structures. Alternatively, the cover 206 may friction fit onto the ladder frame 200. Additionally or alternatively, the cover 206 may be permanently, or at least semi-permanently, secured to the ladder frame 200 with a hinge or hinges that allows the cover 206 to be opened and closed to access the cables 102 without having to remove the cover 206.

Figure 3A:
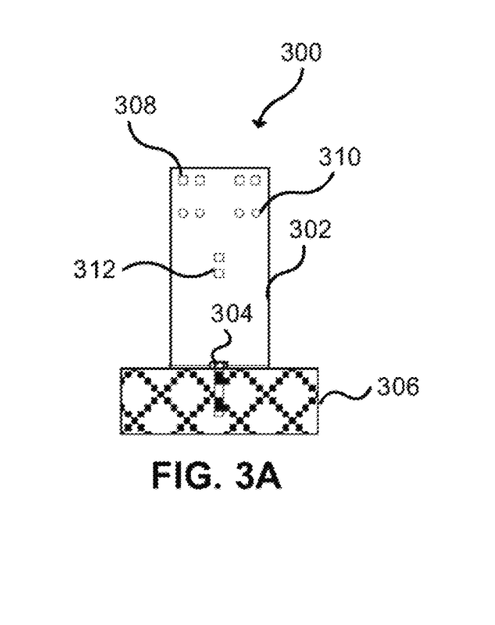
FIG. 3A depicts a side view of a ladder support and preformed block base.

FIG. 3A depicts a side view of a ladder support 300. The ladder support 300 may be used to support the ladder frame 200. A number of ladder supports 300 may be used to support one or more ladder frames 200 in providing an ice bridge. The ladder support 300 comprises a structural support, depicted as a pair of vertical legs 302, for supporting the ladder frame 200, and possibly the cover 206, above the ground. The structural support may be formed from sheet metal with preformed bends to provide additional stability. The structural supports may include one or more mounting points for securing various components of the ice bridge. For example, upper holes 308 may be used for securing a cover to the structural supports. Middle holes 310 may be used for securing ladder frames 200 to the structural support. Lower holes 312 may be used for securing a cross support 314, depicted in FIG. 3B, between vertical legs of the structural support.

The vertical legs 302 of the ladder supports 300 may be secured with a pair of bolts 304 to a preformed base 306. The preformed base 306 rests on the ground so that the structural supports support the ladder frame 200 above the ground by a short distance, such as one to two feet. The preformed base 306 may be made from fibre reinforced concrete or other suitable materials.

Figure 3B:
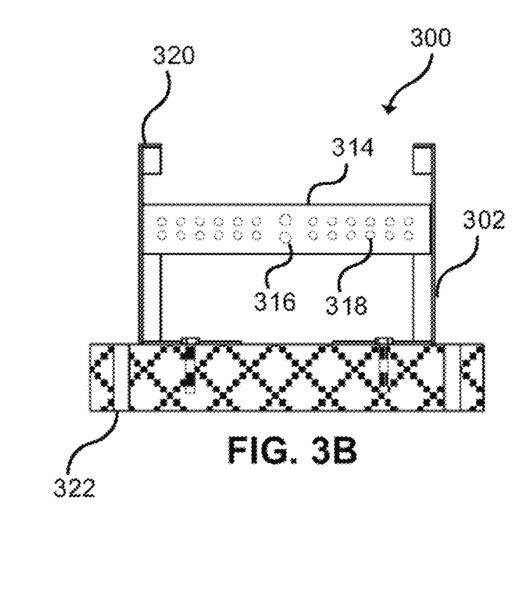
FIG. 3B depicts a front view of a ladder support and preformed block base.

FIG. 3B depicts a front view of the ladder support 300 of FIG. 3A. As depicted, a cross support 314 may include multiple holes 318 that may be used for electrically connecting one or more grounding cables or wires to the cross support 314. The cross support 314 may be made from metal in order to provide a ground bus allowing grounding cables to make an electrically conductive connection when secured with fasteners through the holes 316. One or more of the holes 318 may be used as an earth ground 316 for connecting a cable from the cross support to the earth. A plurality of cable ground holes 318, allow for grounding cables 102 to be bonded to the cross support 314 to form an electrically conductive path from grounding wires or cables of the power and communication cables 102 to the earth to direct lightning that may strike transceiver tower 104 to protect the cables 102 and equipment from damage.

A bracket 320 may be formed at the top of each of the vertical legs 302 of the structural support, which can hold the ladder frame 200 in place and provide additional stability to the structural support when securing a cover 206 to the base support using for example the upper holes 308. The preformed base 306 may include one or more through holes 322 formed within the preformed base 306. The through holes 322 may be used to secure the preformed base 306 in place, for example by driving stakes or spikes through the holes 322 into the ground.

The ladder support 300 allows for the ice bridge to be easily assembled using one or more ladder 300 supports to support one or more ladder frames 200. The ladder supports 300 allow the ice bridge to be assembled on site and low to the ground. Supporting the ladder frames 200 close to the ground creates a short path to the earth for the grounding cables attached to the cross support 314, which may reduce the risk of damage to electrical equipment due a lightning strike.

Figure 4:
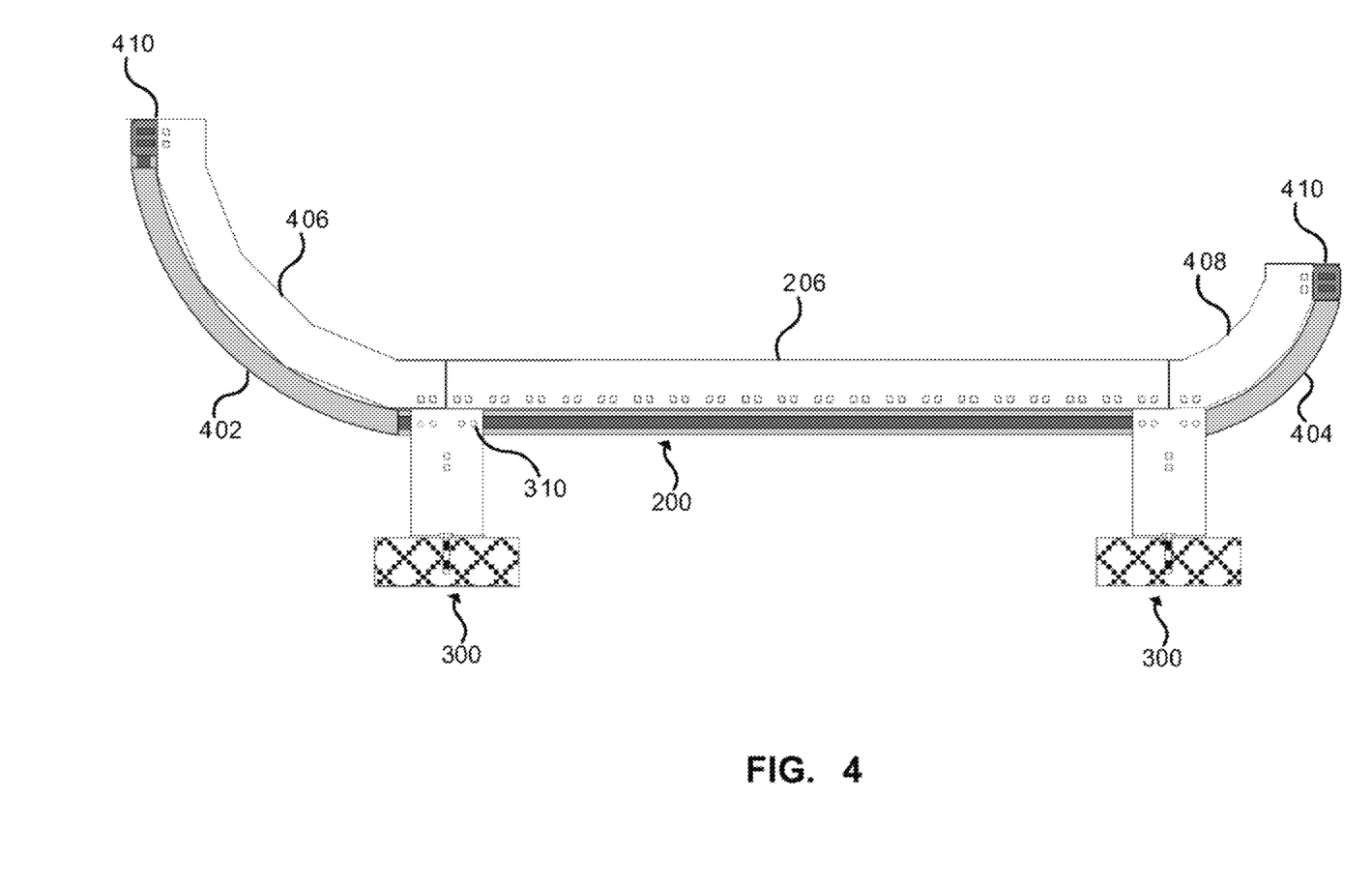
FIG. 4 depicts a side view of an embodiment of an assembled ice bridge.

FIG. 4 depicts a side view of an assembled ice bridge The ice bridge comprises a number of different ladder frame sections and covers supported by a pair of ladder supports 300. A first ladder frame 200 may be secured between the pair of ladder supports 300 and is secured to the middle holes 310. The cover 206 may be placed over the ladder frames 300 and secured in place through the upper holes 308 once the cables 102 have been laid over the ladder frames 200. A large curved ladder frame 402 curved vertically through about 90 degrees may be used to move the power and communications cables 102 from laying horizontally to vertically before attaching to, for example, the transceiver tower 104. The large curved ladder frame 402 protects the cables 102 from sharp bends and abrasion against corners, which can cause damage to cables 102. A small curved ladder frame 404 curved vertically through about 90 degrees may be used to move the power and communications cables 102 from laying horizontally to vertically before entering, for example, the equipment shelter 106. A large curved cover 406 fits over the large curved ladder frame 402 and a small curved cover 408 fits over the small curved ladder frame 404. End brackets 410 may be used to secure the large curved covers 406 and small curved covers 408 to either end of the large curved ladder frame 402 and small curved ladder frame 404 to fix them in place without a ladder support 300.

Figure 5:
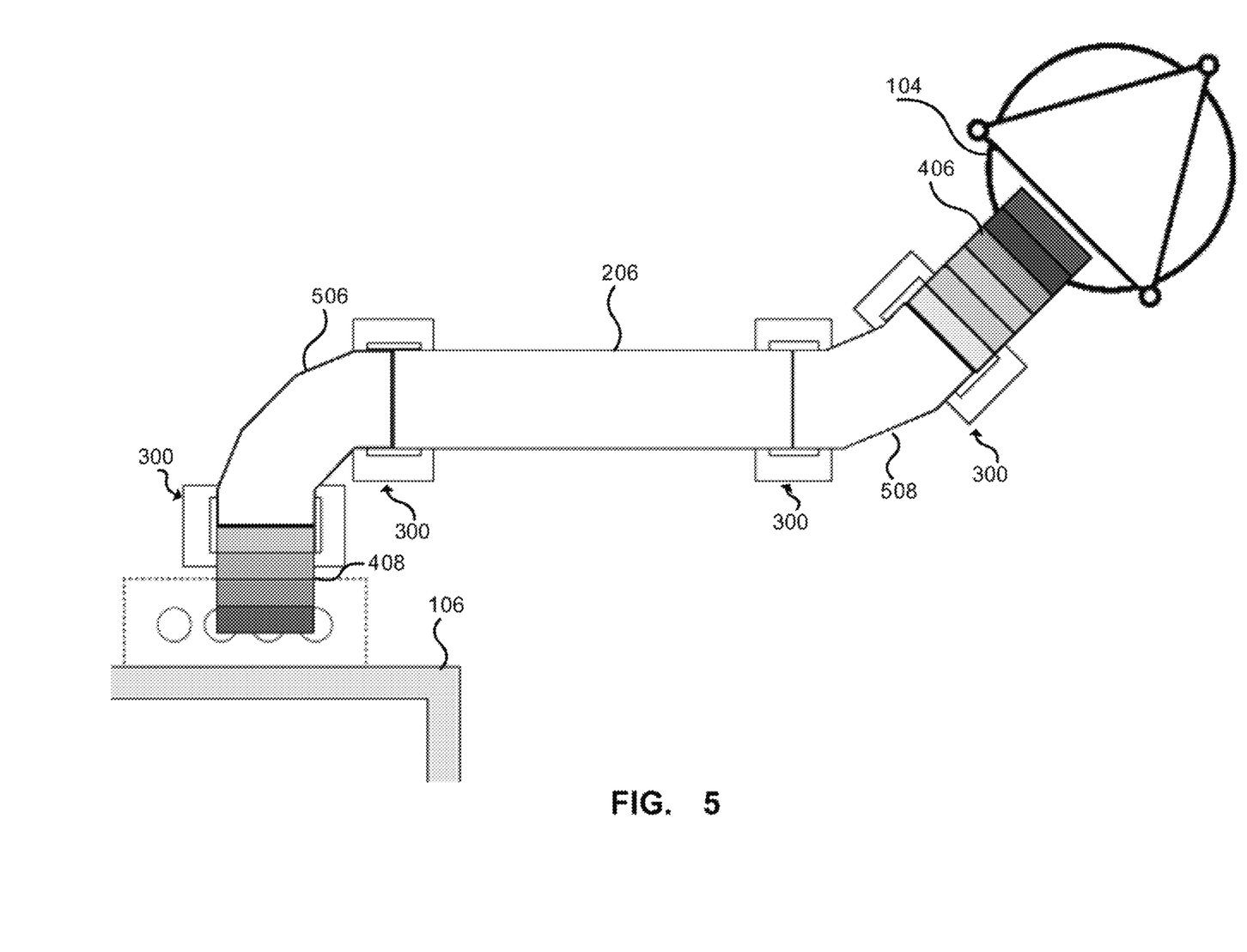
FIG. 5 depicts a top view of another embodiment of the assembled ice bridge.

FIG. 5 depicts a top view of another assembled ice bridge. The ice bridge has a number of different shapes of ladder frames including a straight section comprising the cover 206 and ladder frame 200, horizontally curved sections 506, 508 and vertically curved sections comprising the large curved ladder frame 402 and the large curved cover 406, and the small curved ladder frame 404 and small curved cover 408. As depicted, the ice bridge may comprise a first horizontal curved section 506 that is curved horizontally through about 90 degrees which allows the cables 102 to make a horizontal 90 degree turn. A second horizontal curved section 508 is curved horizontally through about 45 degrees. The horizontal curves 506 and 508 comprise a horizontally curved ladder frame and horizontally curved cover. The horizontal curves protect the cables 102 from sharp bends and abrasions when it is not possible to assemble the ice bridge in a straight path between the cellphone tower 104 and equipment shelter 106, due to obstacles, orientation or terrain. The small curved ladder frame 404 and small curved cover 408 may be physically separated from the equipment shelter 106 to provide an air gap to protect against lightning strikes from travelling from the ice bridge to the equipment shelter 106. The ice bridge may further include vertically curved sections as described above with reference to FIG. 4. The ladder frames may be supported by one or more ladder supports 300 resting on the ground.

Figure 6:
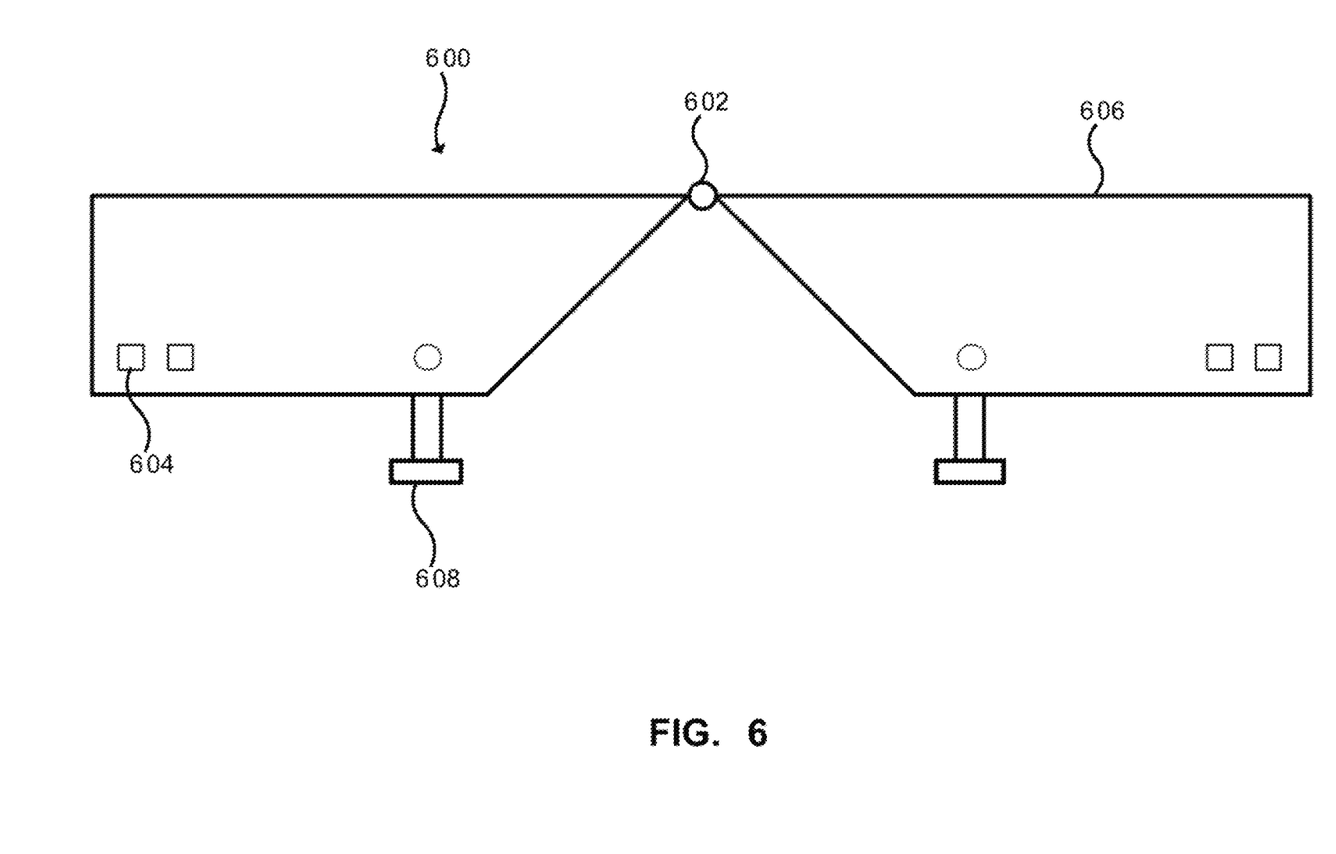
FIG. 6 depicts a side view of a hinge connector.

FIG. 6 depicts a side view of a hinge connector 600. The hinge connector 600 may be used to join ladder frames at a vertical angle to each other. The hinge connector may comprise a hinge 602 connected between side frames 606. The hinge 602 allows the hinge connector 600 to adjust above and below the horizontal by up to 90 degrees or more in either direction. A pair of securing holes 604 may be cut into the side frames 606 to allow the hinge connector 600 to be secured to ladder frames. A pair of suspended rungs 608 may be permanently fixed to the frame 606 under the hinge connector 600 on either side of the hinge 602. The rungs support the power and communication cables 102 as they pass under the hinge 602.

Figure 7:
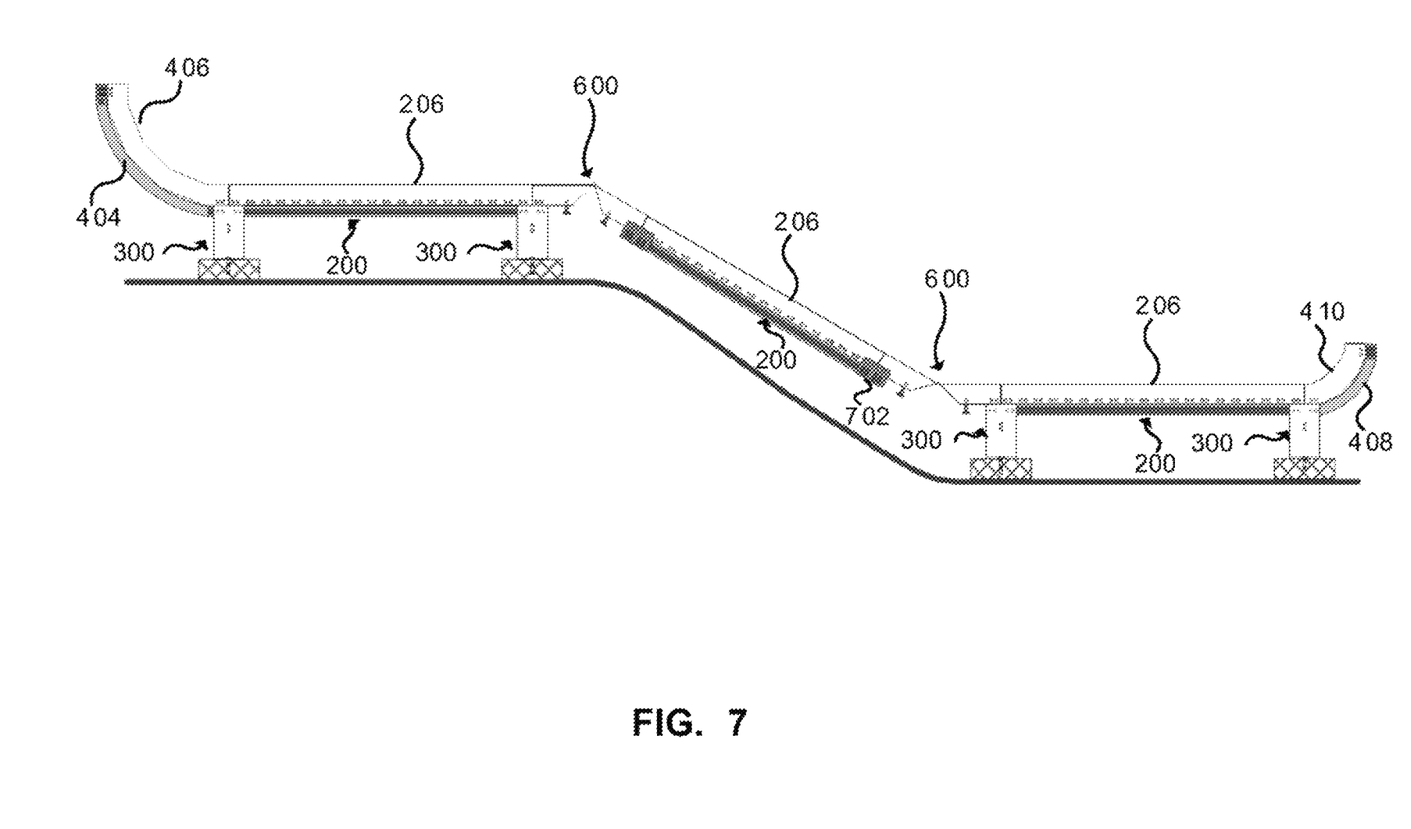
FIG. 7 depicts a side view of an embodiment of the ice bridge over an uneven surface.

FIG. 7 depicts a side view of an ice bridge installed over uneven ground. Hinge connectors 600 are secured to the horizontally level sections of the ice bridge with fasteners secured through the securing holes 604 and the upper holes 308 of the ladder supports 300 on either side of the uneven surface. The section of the ice bridge over the uneven surface is composed of ladder frame 200 and cover 206 secured to the hinge connectors 600 with a bracket 702 on either side and both ends. The brackets 702 are secured with fasteners through the pairs of holes 210 in the sides of ladder frame 200 and the pairs of holes 212 in the covers 206. The hinge connectors 600 allow the ice bridge to adjust up and down in elevation.

It will be appreciated by one of ordinary skill in the art that the system and components shown in FIGS. 1-7 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

What is claimed is:

1. An ice bridge for a cellular transmissions site comprising:
    a ladder frame section to support cables between an equipment shelter and a transceiver tower, wherein a top of the ladder frame section is covered by a cover, and a bottom of the ladder frame section is uncovered; and
    a ladder support securing the ladder frame section above a ground surface, the ladder support comprising:
        a preformed base for resting on the ground surface;
        a structural support comprising vertical legs fixed to the preformed base and extending away from the preformed base, a portion of the vertical legs adapted to support the ladder frame section above the ground surface; and
        a cross support secured between the vertical legs of the structural support, the cross support including one or more holes for electrically connecting one or more grounding wires to the cross support, and wherein the cross support is made of metal.

2. The ice bridge of claim 1, wherein the ladder support secures the ladder frame section no more than approximately two feet above the ground surface.

3. The ice bridge of claim 1, wherein the vertical legs are formed from metal.

4. The ice bridge of claim 1, wherein the portion of the vertical legs adapted to support the ladder frame section above the ground surface comprises one or more mounting points for securing the ladder frame section to the vertical legs.

5. The ice bridge of claim 1, wherein the cover is removably connected to the ladder frame section.

6. The ice bridge of claim 5, wherein the cover has a non-slip surface applied to at least a portion of the top.

7. The ice bridge of claim 1, wherein the ladder frame section is curved horizontally through about 45 degrees or about 90 degrees.

8. The ice bridge of claim 1, wherein the ladder frame section is curved horizontally through about 90 degrees.

9. The ice bridge of claim 1, wherein the ladder frame section is curved vertically through about 90 degrees.

10. The ice bridge of claim 1, further comprising a plurality of ladder supports and ladder frame sections.

11. The ice bridge of claim 10, further comprising a hinged connector attached between two adjacent ladder frame sections.

12. The ice bridge of claim 1, wherein the ladder frame section comprises a plurality of rungs and a pair of side rails connected to each other by the plurality of rungs.

13. A method of assembling an ice bridge at a cellular transmission site between an equipment shelter and a transceiver tower, the method comprising:
    installing a ladder support on a ground surface, comprising:
        securing a preformed base of the ladder support into the ground surface with fasteners inserted through holes in the preformed base and into the ground surface;
        securing a structural support of the ladder support to the preformed base, the structural support comprising vertical legs, the vertical legs when secured extending away from the preformed base, wherein a portion of the vertical legs are adapted to support a ladder frame section above the ground surface; and
        securing a cross support between the vertical legs of the structural support, the cross support including one or more holes for electrically connecting one or more grounding wires to the cross support, and wherein the cross support is made of metal; and
    installing the ladder frame section to the vertical legs of the ladder support such that the ladder frame section is above the ground surface, wherein a top of the ladder frame section is covered by a cover, and a bottom of the ladder frame section is uncovered.

14. The method of claim 13, wherein the ladder support secures the ladder frame section no more than approximately two feet above the ground surface.

15. The method of claim 13, wherein installing the ladder support further comprises grounding the cross support to the earth.

16. The method of claim 13, wherein a plurality of ladder frame sections and ladder supports are installed to form the ice bridge, and wherein the method of assembling the ice bridge further comprises installing a hinged connector between two adjacent ladder frame sections.

17. The method of claim 13, wherein the ladder frame section comprises a plurality of rungs and a pair of side rails connected to each other by the plurality of rungs.

18. The method of claim 13, wherein installing the ladder support further comprises securing the one or more grounding wires to the cross support.

19. The ice bridge of claim 1, wherein the cross support further comprises an earth ground for connecting a cable from the cross support to the earth.

\* \* \* \* \*